(12) United States Patent
Zätterqvist

(10) Patent No.: US 8,720,829 B2
(45) Date of Patent: May 13, 2014

(54) CLOSABLE COUNTER-MEASURE COMPARTMENTS FOR A DISPENSER UNIT

(75) Inventor: Christer Zätterqvist, Uppsala (SE)

(73) Assignee: Saab AB, Linköping (SE)

( * ) Notice: Subject to any disclaimer, the term of this patent is extended or adjusted under 35 U.S.C. 154(b) by 173 days.

(21) Appl. No.: 13/266,083

(22) PCT Filed: Apr. 23, 2009

(86) PCT No.: PCT/SE2009/050425

§ 371 (c)(1),
(2), (4) Date: Jan. 9, 2012

(87) PCT Pub. No.: WO2010/123424

PCT Pub. Date: Oct. 28, 2010

(65) Prior Publication Data

US 2012/0104174 A1    May 3, 2012

(51) Int. Cl.
B64D 1/02        (2006.01)

(52) U.S. Cl.
USPC .......................................... 244/137.1; 89/1.51

(58) Field of Classification Search
USPC ............... 244/137.1, 130, 136, 129.5, 129.1, 244/137.4, 137.3; 89/1.51, 1.58, 1.59, 89/1.817, 37.16, 37.19; 102/504, 505
See application file for complete search history.

(56) References Cited

U.S. PATENT DOCUMENTS

| | | | |
|---|---|---|---|
| 3,430,533 A | 3/1969 | Kifor et al. | |
| 3,511,457 A * | 5/1970 | Pogue | 244/137.3 |
| 3,808,941 A | 5/1974 | Biggs | |
| 4,417,709 A | 11/1983 | Fehrm | |
| 4,616,793 A | 10/1986 | Hassler, Jr. | |
| 4,679,483 A | 7/1987 | Wrana | |
| H324 H | 9/1987 | Rubin | |
| 4,696,442 A | 9/1987 | Mazzitelli | |
| 5,050,477 A | 9/1991 | Cowdery et al. | |
| 5,198,609 A | 3/1993 | Gillman | |
| 5,340,054 A | 8/1994 | Smith et al. | |
| 5,461,960 A | 10/1995 | Marks et al. | |
| 5,699,981 A | 12/1997 | McGrath et al. | |
| 6,098,925 A | 8/2000 | Burdsall, II et al. | |

(Continued)

FOREIGN PATENT DOCUMENTS

EP    1950522 A1    7/2008
FR    2665875 A1    2/1992

(Continued)

OTHER PUBLICATIONS

PCT/ISA/210—International Search Report—Dec. 12, 2009.

(Continued)

*Primary Examiner* — Michelle Clement
*Assistant Examiner* — John D Cooper
(74) *Attorney, Agent, or Firm* — Venable LLP; Eric J. Franklin

(57) ABSTRACT

A dispenser unit including a plurality of compartments, each being adapted for storing and launching a payload and including an opening through which the payload is launched by a control unit/. A door is associated with the opening and is driven by a driver. The dispenser unit includes one common door being arranged in such way that it is drivable to cover the openings of the compartments from which the payloads have been launched.

9 Claims, 2 Drawing Sheets

(56) References Cited

U.S. PATENT DOCUMENTS

| | | |
|---|---|---|
| 6,619,178 B1 | 9/2003 | Fransson et al. |
| 7,373,886 B2 | 5/2008 | Zatterqvist et al. |
| 7,520,467 B2 | 4/2009 | Gioffre et al. |
| 7,600,477 B2 | 10/2009 | Zatterqvist |
| 7,614,334 B2 | 11/2009 | Bellino et al. |
| 7,840,124 B2 | 11/2010 | Olwin |
| 7,866,246 B2 * | 1/2011 | Bellino et al. ............... 89/1.51 |
| 2003/0192992 A1 * | 10/2003 | Olsen et al. ............... 244/137.1 |
| 2004/0104309 A1 | 6/2004 | Segota et al. |
| 2004/0200381 A1 | 10/2004 | Zatterqvist |
| 2004/0200382 A1 | 10/2004 | Zatterqvist et al. |
| 2005/0204910 A1 | 9/2005 | Padan |
| 2009/0084253 A1 | 4/2009 | Bellino et al. |
| 2009/0084254 A1 | 4/2009 | Bellino et al. |
| 2012/0125183 A1 | 5/2012 | Zatterqvist |

FOREIGN PATENT DOCUMENTS

| | | |
|---|---|---|
| GB | 191424021 A | 0/1915 |
| GB | 2177668 A | 1/1987 |
| WO | WO-00/59782 | 10/2000 |
| WO | WO-02/090867 A1 | 11/2002 |
| WO | WO-03/097453 A2 | 11/2003 |

OTHER PUBLICATIONS

PCT/ISA/237—Written Opinion of the International Searching Authority—Dec. 10, 2009.

PCT/IPEA/409—International Preliminary Report on Patentability—Apr. 26, 2011.

European Search Report—Sep. 13, 2013 (Issued in Counterpart Application No. 09843739.5).

* cited by examiner

CLOSABLE COUNTER-MEASURE COMPARTMENTS FOR A DISPENSER UNIT

CROSS-REFERENCE TO RELATED APPLICATIONS

This application is the national phase under 35 U.S.C. §371 of PCT/SE2009/050425 filed 23 Apr. 2009.

TECHNICAL FIELD

The present invention relates to a dispenser unit to be mounted onto a vehicle, such as an aircraft, for launching payloads. The invention relates especially to counter-measure dispensers adapted to military jet aircraft.

BACKGROUND ART

Counter-measure dispensers are known today. The compartments of the dispenser are used for storing and launching counter-measures from a vehicle, such as an aircraft.

A counter-measure dispenser is known from WO 00/59782 disclosing a well functioning arrangement for preventing the occurrence of vibration disturbances, which are primarily caused by inherent oscillations in the empty compartments. During use of the dispenser counter-measures are being launched from the compartments for diverting an enemy attack, e.g. in the form of a target seeking missile. The solution in WO 00/59782 is to arrange a spoiler in front of the opening of the compartment for creating a low dynamic pressure across the opening thereby reducing the interfering noise and vibrations.

U.S. Pat. No. 3,430,533 discloses an arrangement for sealing the counter-means compartments after launching counter-measures. Each compartment has a piston arrangement for sealing the opening, thereby eliminating the aerodynamic loads and vibration effects which are present whenever an open compartment otherwise is subjected to supersonic velocity air streams. The sealing is achieved by the individual piston in each compartment which, after launching of the respective counter-measure, will form an aerodynamically smooth surface with the skin of the dispenser unit.

It is desirable to eliminate the interfering noise and vibrations created by the opening of the compartment after the launch of the counter-measure from the dispenser. The noise is undesirable since it can be used for localisation of the vehicle and the vibrations may cause damage to the vehicle or dispenser structure. At the same time it is desirable to achieve an uncomplicated dispenser unit with as few movable parts as possible and which will have reliability in operation.

SUMMARY OF THE INVENTION

This has been achieved by the dispenser unit.

In such way each compartment can be sealed after that the respective payload (as a counter-measure) has left the dispenser unit (as a counter-measure dispenser) for preventing that the relative wind or air stream flowing past the dispenser will impact against the empty compartment via the opening causing air turbulence, whereby interfering noise and/or vibrations can be avoided. Thereby the structure of the vehicle, such as an aircraft, and the dispenser itself will not be affected by inherent vibration disturbances and as no interfering noise is generated the vehicle will not be detected by the enemy weapon, such as a target seeking missile. Each compartment can be sealed by one common door means which means reliability in operation and simple maintenance since only one door has to be used for closing the compartments one after another in steps associated with the gradual launching of the payloads controlled by the control unit.

Preferably, one driving means is arranged for driving the common door means.

Thereby the reliability in operation further is improved as only one driving source is present. The installation of the driving means requires also minor space in the dispenser unit and a not bulky arrangement is achieved, which is cost effective in the light of vehicle fuel consumption.

Suitably, the control unit is also coupled to the driving means adapted for driving the common door means to cover the compartment associated with the latest launched payload.

In such way the door means can be controlled to be fed over the opening of a compartment depending on whether a payload has been launched there from. A sensor means or a mechanical safety breaker arranged in respective compartment is arranged to send a signal to the control unit indicating that the payload has left the compartment, whereby the control unit in turn controls the driving means to drive the door means a predetermined distance corresponding with a length of the opening seen in the longitudinal direction of the dispenser unit.

Preferably, the door means is a shutter.

Thereby the door means can be made for saving space and simple to use for covering a plurality of compartments.

Suitably, the shutter is adapted to be rolled upon a storing axle.

An electric motor can thus be used for driving the storing axle and the winded shutter step by step depending on whether a payload has been launched. This implies a not bulky installation as well. After use and before loading of the dispenser unit, the shutter can be rolled up again upon the storing axle for exposing the compartments, whereby the payload is inserted in respective compartment and the vehicle is clear for a new mission.

Preferably, the door means is a folding curtain adapted to be foldable into a package in an initial position.

This is also a not bulky arrangement since the door means can be folded into a package without any storing axle. The driving means can in this case be arranged as a draw wire coupled to an electrical motor being controlled by the control unit. The draw wire may alternatively be coupled to a pneumatic engine controlled by the control unit for a stepwise motion of the door means in steps associated with the launched payload. That is, in a manner depending upon whether the individual payload, such as a counter-measure element (e.g. a chaff or flare), has been launched from that particular compartment.

Suitably, the payload is a counter-measure element.

In this way the dispenser unit (counter-measure dispenser) can be used for protecting an aircraft from an eventual enemy attack. The aircraft can avoid seeking missiles adapted for seeking targets generating noise.

Preferably, the dispenser unit comprises two door means, each of which is arranged to cover the openings of a separate row of compartments.

Thereby several rows of compartments can be arranged in a dispenser unit, wherein each row stepwise can be covered by an individual shutter.

Suitably, the door means is made of a frangible material.

In this way, in case of malfunction wherein the door means inadvertently is driven over an opening of a compartment before the payload is launched from that particular compartment, the payload can be launched from the dispenser unit. The payload will be ejected from the compartment through the door means made of frangible material and an area of the door means corresponding with the position of the opening will split.

Preferably, a spoiler element projecting outwardly is arranged onto and adjacent an advancing end of the door means.

Thereby occurrence of vibration disturbances and noise, caused by wind load against the open compartment immediately after the launch of an individual payload, can be avoided. The spoiler element is designed in a suitable way for creating a low dynamic pressure across the opening nearest the advancing end of the door means. Thereby vibration and noise can be avoided immediately after the launch of the payload and before the control unit drives the door means over the actual opening.

Suitably, the counter-measure element is arranged in the dispenser unit in such a way that it during use can be launched from the dispenser unit in an optional direction.

Thereby the detected threat can be even more effective led away, since the counter-measure elements can be launched in an optimal direction towards the threat.

BRIEF DESCRIPTION OF THE DRAWINGS

The present invention will now be described by way of example with reference to the accompanying schematic drawings, of which.

DETAILED DESCRIPTION

Hereinafter, embodiments of the present invention will be described in detail with reference to the accompanying drawings, wherein for the sake of clarity and understanding of the invention some details of no importance are deleted from the drawings.

Figure 1A:
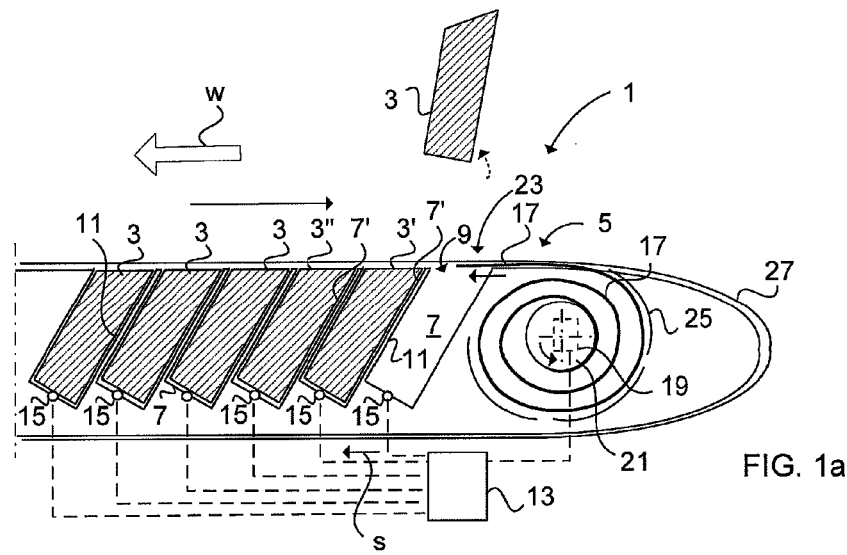
FIG. 1a illustrates a cross section of a dispenser unit having launched a first flare according to a first embodiment.

FIG. 1a schematically illustrates a dispenser unit 1 adapted for encompassing a plurality of chaffs 3. The dispenser unit 1 comprises an elongated body 5 with a plurality of compartments 7, which are provided with openings 9 and are separated in the longitudinal direction of the elongated body 5 by partition walls 11 and which are used for storing the counter measure elements, here the chaffs 3. The dispenser unit 1 is designed to be mounted on an aircraft (not shown) with the longitudinal direction of the elongated body 5 essentially coinciding with the flight direction f of the aircraft. The chaffs 3 are connected to a control unit 13 for transmitting a signal to an ignition member 15, each of which is adapted to launch the respective chaff 3. The counter measure element may be also chaff foil, metal coated glass fibres, IR flares etc. The dispenser unit 1 thus is used for diverting an eventual enemy attack, such as a target seeking missile, towards the launched counter measure elements.

The dispenser unit 1 thus comprises a plurality of compartments 7, each of which is adapted for storing and launching the chaff 3. Each compartment 7 further comprises the opening 9 through which the chaff 3 is launched by means of the control unit 13. A flexible shutter 17 is arranged to cover the openings 9 and is driven by an electrical motor 19 connected to a storing axle 21. The storing axle 21 or roller is adapted for storing and unwinding the flexible shutter 17 from the storing axle 21. The electrical motor 19 is arranged for driving an advancing end 23 of the shutter 17 over the openings 9 depending on the launch sequence of chaffs 3. A guide 25 is arranged near the storing axle 21 and is adapted for co-operation with the storing axle 21 for guiding the flexible shutter 17 in a correct path from the storing axle 21. The dispenser unit 1 thus comprises one common flexible shutter 17 being arranged in such way that it is drivable to cover the openings 9 of the compartments 7 from which the payloads (here chaffs 3) have been launched. In such way each compartment 7 is sealed after that the respective chaff 3 has left the dispenser unit 1. Thereby is prevented that the relative wind w or air stream flowing past the dispenser unit 1 will impact against the empty compartment 7 via the opening 9 causing air turbulence, whereby interfering noise and/or vibrations can be avoided. Thereby the structure of the aircraft, and of the dispenser unit 1 itself, will not be affected by inherent vibration disturbances and as no interfering noise is generated, the aircraft will not be detected due to interfering noise by the enemy weapon, such as a target seeking missile (not shown). As each compartment 7 can be sealed by one common shutter 17, the reliability in operation and simple maintenance will be possibly, since only one door means has to be used for closing the compartments 7 one after another in steps associated and in connection with the gradual launching of the chaffs 3.

The flexible shutter 17 is thus before use winded onto the storing axle 21, which is arranged between a nose cone 27 of the dispenser unit 1 and the compartments 7 storing the chaffs 3. The storing axle 21 is coupled to the electrical motor 19. When a threat is detected by the aircraft's protection system (not shown) a signal s will be sent from the control unit 13 to the compartment 7' loaded with a chaff 3 positioned nearest the advancing end 23 of the shutter 17 and which compartment 7' is adjacent the compartment 7 from which the latest chaff 3 has been launched. The signal s triggers the firing of the chaff 3' from this specific compartment 7' and shortly thereafter the control unit 13 sends a second signal to the electrical motor 19 for a stepwise rotation of the storing axle 21 (in one step) by means of the electrical motor 19. The stepwise rotation of the storing axle 21 is of such amount that the in the longitudinal direction driven flexible shutter 17 will advance to close that specific compartment 7 which precisely has been emptied. If a plurality of chaffs 3 has to be launched to lead away the threat from the aircraft, the next adjacent chaff 3" nearest the advancing end 23 is fired from its appurtenant compartment 7" and the advancing end 23 is thereafter moved over the opening 9 of that compartment 7". In this way, wherein for example five chaffs 3 are controlled to be launched, this procedure is repeated five times. The stepwise motion of the flexible shutter 17 is achieved by the control unit 13 controlling the action of the electrical motor 19. The further away from the storing axle 21 the advancing end 23 is positioned, the greater number of revolutions the storing axle 21 has to perform.

Figure 1B:
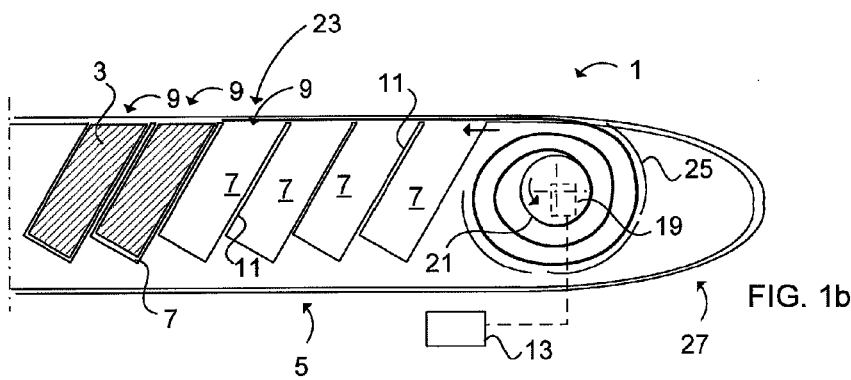
FIG. 1b illustrates the dispenser unit in FIG. 1a wherein a flexible shutter stepwise has advanced covering four compartments.

FIG. 1b illustrates the dispenser unit 1 in FIG. 1a wherein the flexible shutter 17 stepwise has advanced a distance covering four compartments 7 from which four chaffs 3 earlier have been launched. By the arrangement of the storing axle 21 and electrical motor 19 in a space between the nose cone 27 and the compartments 7, the dispenser unit 1 can be made less bulky and easier than known dispenser units solving the same problem regarding interfering noise and/or vibrations.

Figure 2:
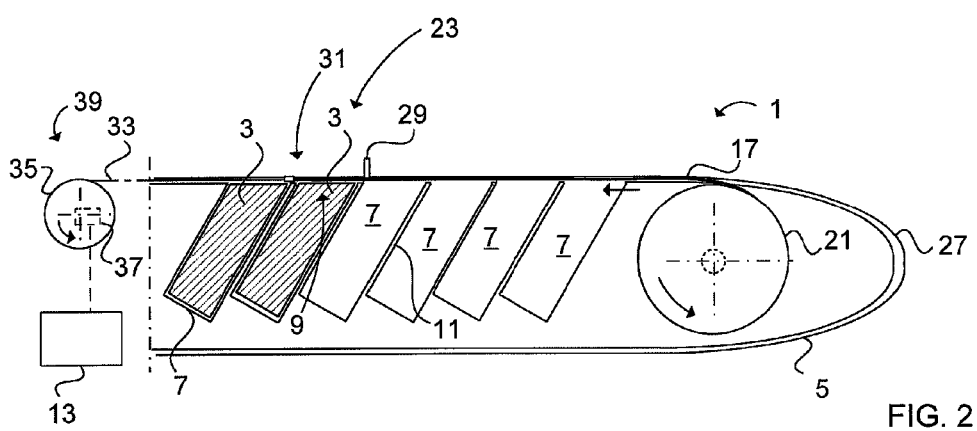
FIG. 2 illustrates a second embodiment of the dispenser unit.

FIG. 2 illustrates a second embodiment of the dispenser unit 1 wherein a spoiler 29 has been arranged on the outside of the flexible shutter 17 near the shutter's advancing end 23, i.e. the end of the elongated flexible shutter 17, which covers the compartment 7 from which the latest launched chaff 3 was stored. The distance from a forward edge 31 of the advancing end 23 to the spoiler 29 corresponds with the measurement of the opening 9 seen in the longitudinal direction of the dispenser unit 1. The flexible shutter 17 is also made of a frangible material. In this way, in case of malfunction wherein the flexible shutter 17 by mistake is driven over an opening 9 of a compartment 7 before the payload (here chaff 3) is launched from that particular compartment 7, the payload still can be launched from the dispenser unit 1. The chaff 3 will in that case be ejected from the compartment 7—through the flexible shutter 17—within an area of the flexible shutter 17 corresponding with the position of the actual opening 9. The flexible shutter 17 will split within this area. The spoiler 29 will affect the air stream (relative wind w) in order to create a low dynamic pressure across the split opening for preventing interfering noise. According to this embodiment the flexible shutter's 17 advancing end 23 is coupled to a wire 33 which is wound upon a driving roller 35 driven by a pneumatic motor 37, which arrangement is mounted in the back part 39 of the dispenser unit 1, i.e. on the other side of the set of compartments 7 relatively the storing axle 21. The storing axle 21 is mounted on a bearing for free rotation in the nose cone 27. By this arrangement the flexible shutter 17 is drawn over the openings 9 by means of the wire 33.

Figure 3:
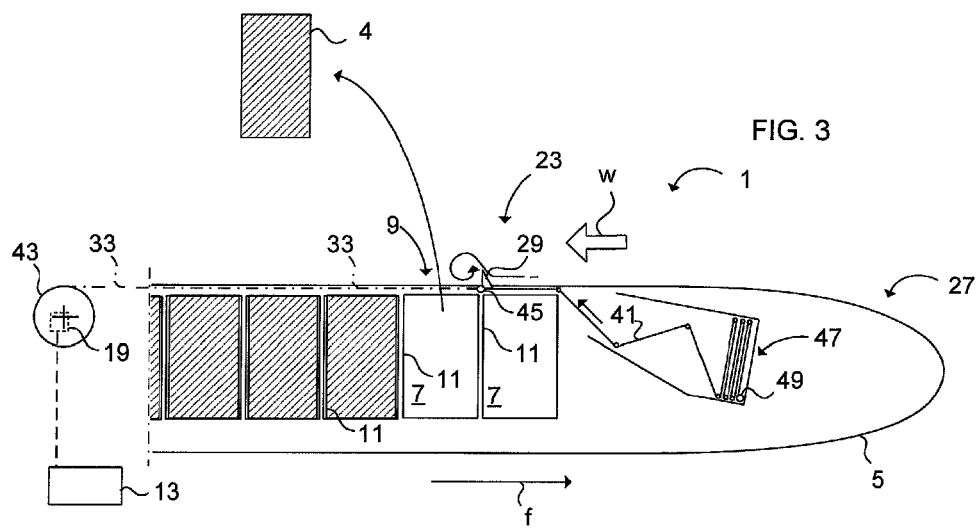
FIG. 3 illustrates a cross section of a dispenser unit according to a third embodiment.

FIG. 3 schematically illustrates a cross section of a dispenser unit 1 according to a third embodiment. The door means is arranged as a folding curtain 41 in the nose cone 27. In a fully folded state (in an initial position) a not bulky package can thus be achieved. The driving means is in this case a draw wire 33 connected to a motor driven roller 43 arranged for drawing the folding curtain 41 step wise in steps over each compartment's 7 opening 9 depending on whether the next payload 4 has been launched from that particular compartment 7. This action is controlled by the control unit 13. The draw wire 33 is thus also connected via a coupling 45 to the folding curtain 41. A spoiler 29 is arranged onto the advancing end 23 of the folding curtain 41. The advancing end 23 is defined as the end of the folding curtain 41 being nearest the coupling 45 and an opposite end 47 of the folding curtain 41 is defined as the end fastened to a holder 49 arranged in the nose cone 27. The spoiler 29 projects outwardly, i.e. in a direction essentially perpendicular to the prolongation of the elongated dispenser unit 1 and is arranged to meet the relative wind w outside the dispenser unit 1 when it is used. Thereby occurrence of vibration disturbances and noise, caused by wind load against the open compartment 1 immediately after the launch of an individual payload 4, can be avoided. The spoiler 29 is designed in a suitable way for creating a low dynamic pressure across the opening 9 nearest the advancing end 23 of the folding curtain 41. Vibrations and noises can thus be avoided immediately after the launch of the payload from the compartment 7 and before the control unit 13 achieve a driving action of the folding curtain 41 over the opening 9 belonging to that actual compartment 7 which has been emptied.

Figure 4:
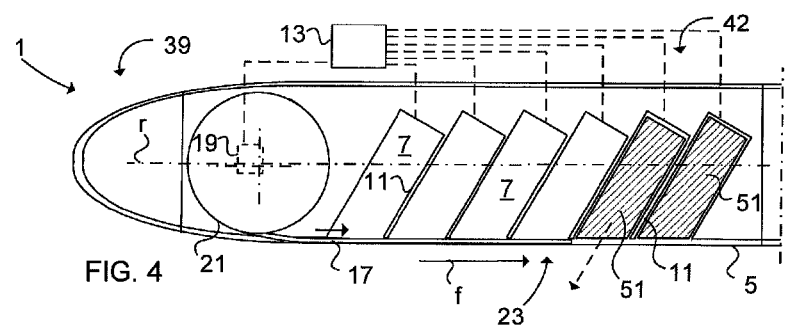
FIG. 4 illustrates a cross section of a dispenser unit according to a fourth embodiment.

FIG. 4 schematically illustrates a cross section of a dispenser unit 1 according to a fourth embodiment wherein the storing axle 21 and the electrical motor 19 are arranged in the back part 39 of the dispenser unit 1 for storing and driving the shutter 17. In this way no driving means has to be arranged in the nose cone, whereby the nose cone can be designed with any aerodynamic body required. In FIG. 4 four IR flares 51 have been launched. The first of which being launched was situated in the rearmost compartment 7, which thereafter was sealed by the advancing end 23 of the shutter 17. A stepwise motion was performed by means of the control unit 13 in such way that the advancing end 23 was stopped for not covering the next IR flare 51 to be launched. Thereafter the control unit 13 fed a signal to launch this next IR flare 51 and immediately thereafter the control unit 13 gave a signal to the electrical motor 19 to drive the shutter 17 such that the advancing end 23 covered that particular compartment 7 from which this next IR flare 51 has been launched. This procedure was repeated in a stepwise way and the fifth IR flare 51 is ready to be launched. When the threat threatening the aircraft (not shown) has vanished, the control unit 13 controls the dispenser unit 1 not to launch any further IR flares 51.

In FIG. 4 is also shown that a portion 42 comprising the compartments 7 is rotatable arranged in the dispenser unit 1. The counter-measure elements are thus arranged in the dispenser unit 1 in such a way that it during use can be launched from the dispenser unit in an optional direction. The portion 42 is rotatable about a rotation axis r indicated in FIG. 4 and can rotate to any desired position for launching or the launching can be performed during the rotation. Thereby the detected threat can be even more effective led away, since the counter-measure elements 51 can be launched in an optimal direction towards the threat.

Figure 5:
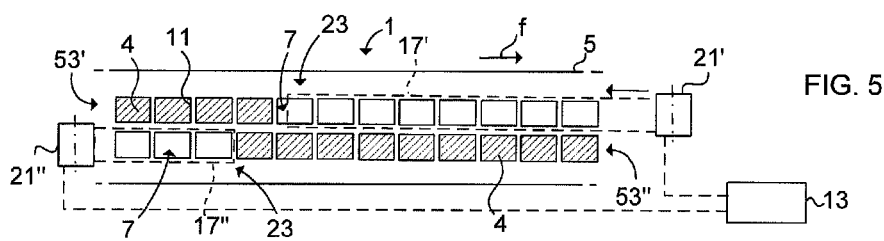
FIG. 5 illustrates in a view from above a counter measure dispenser having two rows of counter measure elements.

FIG. 5 schematically illustrates in a view from above a counter measure dispenser unit 1 having two parallel rows 53', 53" of payloads 4. A first storing axle 21', comprising a first motor, drives a first shutter 17' backwardly over the compartments 7 of the first row 53'. A second storing axle 21", comprising a second motor, drives a second shutter 17" forwardly over the compartments 7 of the second row 53". The first and second motors are controlled by a common control unit 13. In this way in pairs launched payloads 4 can be achieved. Alternatively, the control unit 13 can launch a separate payload 4 one after another depending on the danger of the threat.

Figure 6:
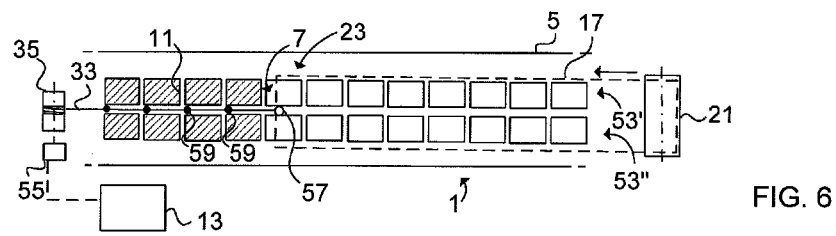
FIG. 6 illustrates a dispenser unit according to a sixth embodiment.

FIG. 6 schematically illustrates a dispenser unit 1 according to a sixth embodiment, wherein a single shutter 17 is provided for covering two parallel rows 53', 53" of payloads. The shutter 17 is stored and winded upon a freely rotatable storing axle 21, wherein one end of the shutter 17 is fastened onto the storing axle 21. The other end (advancing end 23) of the shutter 17 is coupled to a draw wire 33. The draw wire 33 is arranged to be wound up onto a roller 35 able to be stepwise driven by a motor 55 controlled by the control unit 13. A sensor 57 arranged at the advancing end 23 of the shutter 17 provides a signal to the control unit 13 for stopping the motion (off state of motor 55) of the shutter 17 when it covers and seals the actual compartment 7 from the air flow (relative wind w). A built-in counter action of the storing axle 21 restrains the shutter 17 so that it not buckles and holds at the same time the wire 33 stretched.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. The driving of the door means may be performed in many ways, for example the relative wind can be used by arranging a spoiler at the advancing end of the door means, which spoiler also due to the air pressure generates a traction force drawing the door means over the openings stepwise. The stepwise motion of the door means can be achieved by that each payload has a shoulder stopping the advancing end. When the payload has left its compartment, the door means is free to advance to the shoulder of the next payload. The stepwise motion of the door means may also be achieved by mechanical relays or electromagnetic pull without the need of sensors. The number of rows being covered by one door means during use can of course be more than two. Two or more counter-measure elements can be launched before the door means is moved over the respective compartment from which the elements have launched. It is thus of course to cover a whole row of compartments in one step, which compartments earlier have been emptied of payloads.

The invention claimed is:

1. A dispenser unit, comprising:
   compartments each of which is adapted for storing and launching a counter-measure and comprises an opening through which the counter-measure is launched by a control unit,
   a door associated with the opening, and
   a driver configured to drive the door, wherein the dispenser unit comprises one common door being arranged in such way that the door is drivable to cover the openings of the compartments from which the counter-measures have been launched, wherein one driver is arranged for driving the common door, and wherein the control unit is also coupled to the driver adapted for driving the common door to cover one of the compartments associated with a latest launched counter-measure.

2. The dispenser unit according to claim 1, wherein the door is a shutter.

3. The dispenser unit according to claim 2, wherein the shutter is adapted to be rolled upon a storing axle.

4. The dispenser unit according to claim 1, wherein the door is a folding curtain adapted to be foldable into a package in an initial position.

5. The dispenser unit according to claim 1, wherein the counter-measure element is arranged in the dispenser unit in such a way that the counter-measure element during use can be launched from the dispenser unit in any desired direction.

6. The dispenser unit according to claim 1, wherein the door is made of a frangible material.

7. The dispenser unit according to claim 1, further comprising:
   a spoiler element projecting outwardly is arranged onto and adjacent an advancing end of the door.

8. An aircraft, comprising:
   at least one dispenser unit comprising compartments each of which is adapted for storing and launching a counter-measure and comprising an opening through which the counter-measure is launched by a control unit, a door associated with the opening, and a driver configured to drive the door, wherein the dispenser unit comprises one common door being arranged in such way that the door is drivable to cover the openings of the compartments from which the counter-measures have been launched, wherein one driver is arranged for driving the common door, and wherein the control unit is also coupled to the driver adapted for driving the common door to cover one of the compartments associated with a latest launched counter-measure.

9. The dispenser unit according to claim 1, wherein a portion of the dispenser unit comprising the compartments is rotatably arranged in the dispenser unit such that the portion is rotatable to a desired position for launching the counter-measures or the counter-measures can be launched during rotation of the portion.

* * * * *

UNITED STATES PATENT AND TRADEMARK OFFICE
CERTIFICATE OF CORRECTION

Page 1 of 1

PATENT NO. : 8,720,829 B2
APPLICATION NO. : 13/266083
DATED : May 13, 2014
INVENTOR(S) : Christer Zatterqvist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this
Twenty-eighth Day of July, 2015

Michelle K. Lee
*Director of the United States Patent and Trademark Office*